(12) United States Patent
Kamon et al.

(10) Patent No.: US 11,123,883 B2
(45) Date of Patent: Sep. 21, 2021

(54) WORK ROBOT

(71) Applicant: KAWASAKI JUKOGYO KABUSHIKI KAISHA, Kobe (JP)

(72) Inventors: Masayuki Kamon, Akashi (JP); Soichi Tamada, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 191 days.

(21) Appl. No.: 16/076,642

(22) PCT Filed: Feb. 7, 2017

(86) PCT No.: PCT/JP2017/004402
§ 371 (c)(1),
(2) Date: Aug. 8, 2018

(87) PCT Pub. No.: WO2017/138524
PCT Pub. Date: Aug. 17, 2017

(65) Prior Publication Data
US 2019/0039254 A1    Feb. 7, 2019

(30) Foreign Application Priority Data
Feb. 8, 2016  (JP) .............................. JP2016-022162

(51) Int. Cl.
*B25J 13/08* (2006.01)
*B25J 19/06* (2006.01)
(Continued)

(52) U.S. Cl.
CPC .............. *B25J 19/06* (2013.01); *B25J 9/0012* (2013.01); *B25J 9/1694* (2013.01); *B25J 13/081* (2013.01); *B25J 19/063* (2013.01)

(58) Field of Classification Search
CPC ...... B25J 9/0012; B25J 9/1674; B25J 9/1694; B25J 13/081; B25J 13/087; B25J 19/06;
(Continued)

(56) References Cited

U.S. PATENT DOCUMENTS

| 5,744,728 A | 4/1998 | Suita et al. |
| 2011/0218676 A1* | 9/2011 | Okazaki ................. B25J 9/1633 700/260 |

(Continued)

FOREIGN PATENT DOCUMENTS

| EP | 1 810 795 A1 | 7/2007 |
| JP | S61-33894 A | 2/1986 |

(Continued)

OTHER PUBLICATIONS

Apr. 11, 2017 International Search Report issued in International Patent Application No. PCT/JP2017/004402.

*Primary Examiner* — Robert T Nguyen
(74) *Attorney, Agent, or Firm* — Oliff PLC

(57) ABSTRACT

A robot with an impact buffering member on the surface of a robot arm for alleviating the impact when the arm contacts an object; and a contact detection unit for detecting a contact between the robot arm and object. The unit has a soft porous member on the front surface side of the impact buffering member and softer than the member; a housing member including the soft porous member and formed of a flexible material; a fluid discharge pipe for discharging a fluid inside the housing member when the object makes contact so the volume of the housing member decreases; and a volume change detection portion for detecting a change in volume of the housing member by utilizing the discharged fluid. It is possible to secure sufficient safety in a cooperative work between a person and a robot or the like, even when the person contacts the robot arm.

9 Claims, 8 Drawing Sheets

(51) Int. Cl.
*B25J 9/00* (2006.01)
*B25J 9/16* (2006.01)

(58) Field of Classification Search
CPC ............... B25J 19/063; B25J 19/0091; G05B 2219/40199; G05B 2219/40201
See application file for complete search history.

(56) References Cited

U.S. PATENT DOCUMENTS

| | | |
|---|---|---|
| 2015/0127158 A1 | 5/2015 | Shimodaira |
| 2015/0174771 A1 | 6/2015 | Fujita |
| 2016/0167231 A1* | 6/2016 | Nakayama ............. B25J 9/1676 700/255 |
| 2018/0147733 A1* | 5/2018 | Takeuchi ............. B25J 19/0054 |
| 2020/0001460 A1* | 1/2020 | Sato ........................ F16P 3/12 |
| 2020/0130623 A1* | 4/2020 | Baldinger ........... B60R 21/0136 |
| 2020/0338762 A1* | 10/2020 | Watanabe ................ B25J 9/101 |

FOREIGN PATENT DOCUMENTS

| | | |
|---|---|---|
| JP | S63-39786 A | 2/1988 |
| JP | H08-11085 A | 1/1996 |
| JP | H10-249785 A | 9/1998 |
| JP | 2004-34251 A | 2/2004 |
| JP | 2008-302496 A | 12/2008 |
| JP | 2009-229453 A | 10/2009 |
| JP | 2010-214474 A | 9/2010 |
| JP | 2013-545625 A | 12/2013 |
| JP | 2015-123505 A | 7/2015 |

* cited by examiner

WORK ROBOT

TECHNICAL FIELD

The present invention relates to a work robot for driving a robot arm to perform operations such as transport of workpieces.

BACKGROUND ART

In recent years, the development of a robot assuming a cooperative work between a person and a robot is proceeding actively, and various measures are studied for securing human safety in the cooperative work with the robot.

As one of such measures, a technique is proposed in which a sensor detects that a person approaches the robot, and the operation of the robot is controlled based on the detection result (refer to Patent Document 1). For example, when a sensor detects that a person approaches the robot, the operation of the robot is stopped to avoid contact with the person, or the operation speed of the robot slows down to reduce the impact force given to the person even when it contacts the person.

Further, a technique is proposed in which a sensor (for example, a capacitance sensor) is attached to the surface of the robot arm to stop the operation of the robot when the sensor detects that a person or an obstacle approaches the surface of the robot arm (refer to Patent Document 2).

CITATION LIST

Patent Document

[Patent Document 1] Japanese Patent Application Laid-open No. 2008-302496
[Patent Document 2] Japanese Patent Application Laid-open No. 2013-545625
[Patent Document 3] Japanese Patent Application Laid-open No. 2009-229453

SUMMARY OF INVENTION

Objects to be Achieved by the Invention

Here, when an erroneous detection occurs in a sensor for detecting the approach of a person or an obstacle, the operation of the robot during operation is unnecessarily restricted causing reduction of working time and decline in production efficiency. Therefore, it is necessary to prevent such malfunction.

However, according to the conventional technique of detecting the approach of a person or an obstacle by a sensor before contacting the robot arm, even when it is attempted to appropriately set the sensitivity and position of the sensor to prevent erroneous detection, it is difficult to appropriately deal with all of various working environments and sufficiently reduce the possibility of erroneous detection to an acceptable level.

Further, it is also conceivable to provide a cushioning material on the surface of the robot arm to alleviate the impact given to a person when the person contacts the robot arm during operation. However, even in such a case, it is impossible to secure a sufficient safety level unless some restriction is added to the operation of the robot after detecting the contact between the person and the robot arm. For example, there is a possibility that the person may be caught by the robot arm which continues to move.

Here, there is a problem that, when attempting to arrange the sensor for detecting that a person contacts the robot arm to the robot arm, it is difficult to secure the arrangement position of the sensor since the cushioning material is provided on the surface of the robot arm. In order to solve this problem, it is conceivable, for example, to embed the sensor inside the cushioning material and operate the sensor by deformation of the cushioning material (refer to Patent Document 3).

However, in this method, there is a problem that it is difficult to secure sufficient sensitivity since the operation of the sensor depends on the deformation state of the cushioning material. Specifically, when an external force acts in a substantially perpendicular direction with respect to the surface of the cushioning material, there is no problem since the deformation state sufficient for operating the sensor is generated in the cushioning material, while, when an external force acts in an oblique direction with respect to the surface of the cushioning material, the deformation state of the cushioning material may be insufficient to operate the sensor.

Therefore, even when the robot arm during operation contacts a person, there is a possibility that the sensor does not operate depending on the contact direction and the robot arm continues to move thereby pinching the person.

It is also conceivable to provide a sensor for detecting that a person contacts the robot arm directly on a robot arm which is not provided with the cushioning material. In that case, it is necessary to instantly and surely detect the contact and limit the operation of the robot arm.

The present invention is made considering the above-mentioned problems of the conventional technology, and its object is to provide a work robot capable of securing sufficient safety in a cooperative work between a person and a robot or the like even when the robot arm contacts the person, by instantaneously and surely detecting the contact and limiting the operation of the robot.

Means for Achieving the Objects

In order to achieve the above-mentioned objects, a work robot according to a first aspect of the present invention comprises: a robot arm; an impact buffering member provided on a surface of the robot arm for alleviating an impact when the robot arm contacts an object; and a contact detection unit for detecting a contact between the robot arm and the object, the contact detection unit having a soft porous member provided on a front surface side of the impact buffering member and softer than the impact buffering member; a housing member including the soft porous member and formed of a flexible material; a fluid discharge pipe communicating with an inside of the housing member, the fluid discharge pipe discharging a fluid inside the housing member when the object contacts the housing member and a volume of the housing member decreases; and a volume change detection portion for detecting that a volume of the housing member is changed by utilizing the fluid discharged through the fluid discharge pipe.

A second aspect of the present invention further comprises, in the first aspect, a robot controller for controlling driving of the robot arm, wherein the robot controller is configured to control driving of the robot arm based on a detection signal from the volume change detection portion.

A third aspect of the present invention is that, in the first or second aspect, the robot controller is configured to bring the robot arm into contact with a known object with a predetermined operation and determine, based on a detection signal from the volume change detection portion at that time, whether or not the contact detection unit normally operates.

A fourth aspect of the present invention is that, in the third aspect, the known object is a structure configuring a part of the work robot.

A fifth aspect of the present invention is that, in any one of the first to fourth aspects, the impact buffering member is arranged outside the housing member.

A sixth aspect of the present invention is that, in any one of the first to fourth aspects, the impact buffering member is arranged inside the housing member.

A seventh aspect of the present invention is that, in any one of the first to sixth aspects, the fluid is air.

In order to achieve the above-mentioned objects, a work robot according to an eighth aspect of the present invention comprises: a robot arm; and a contact detection unit provided on a surface of the robot arm for detecting a contact between the robot arm and the object, the contact detection unit having a soft porous member having a function of alleviating an impact when the robot arm contacts an object; a housing member including the soft porous member and formed of a flexible material; a fluid discharge pipe communicating with an inside of the housing member, the fluid discharge pipe discharging a fluid inside the housing member when the object contacts the housing member and a volume of the housing member decreases; and a volume change detection portion for detecting that a volume of the housing member is changed by utilizing the fluid discharged through the fluid discharge pipe.

A ninth aspect of the present invention further comprises, in the eighth aspect, a robot controller for controlling driving of the robot arm, wherein the robot controller is configured to control driving of the robot arm based on a detection signal from the volume change detection portion.

In order to achieve the above-mentioned objects, a work robot according to a tenth aspect of the present invention comprises: a robot arm; and a contact detection unit provided on a surface of the robot arm for detecting a contact between the robot arm and the object, the contact detection unit having a soft porous member; a housing member including the soft porous member and formed of a flexible material; a fluid discharge pipe communicating with an inside of the housing member, the fluid discharge pipe discharging a fluid inside the housing member when the object contacts the housing member and a volume of the housing member decreases; and a volume change detection portion for detecting that a volume of the housing member is changed by utilizing the fluid discharged through the fluid discharge pipe.

An eleventh aspect of the present invention is that, in the tenth aspect, at least a part of the robot arm is formed of an impact buffering member for alleviating an impact when the robot arm contacts an object; wherein the housing member is provided on a surface of the impact buffering member. A twelfth aspect of the present invention further comprises, in the tenth or eleventh aspect, a robot controller for controlling driving of the robot arm, wherein the robot controller is configured to control driving of the robot arm based on a detection signal from the volume change detection portion.

Advantageous Effect of the Invention

According to the present invention, there can be provided a work robot capable of securing sufficient safety in a cooperative work between a person and a robot or the like even when the robot arm contacts the person, by instantaneously and surely detecting the contact and limiting the operation of the robot.

EMBODIMENT OF THE INVENTION

Figure 1:
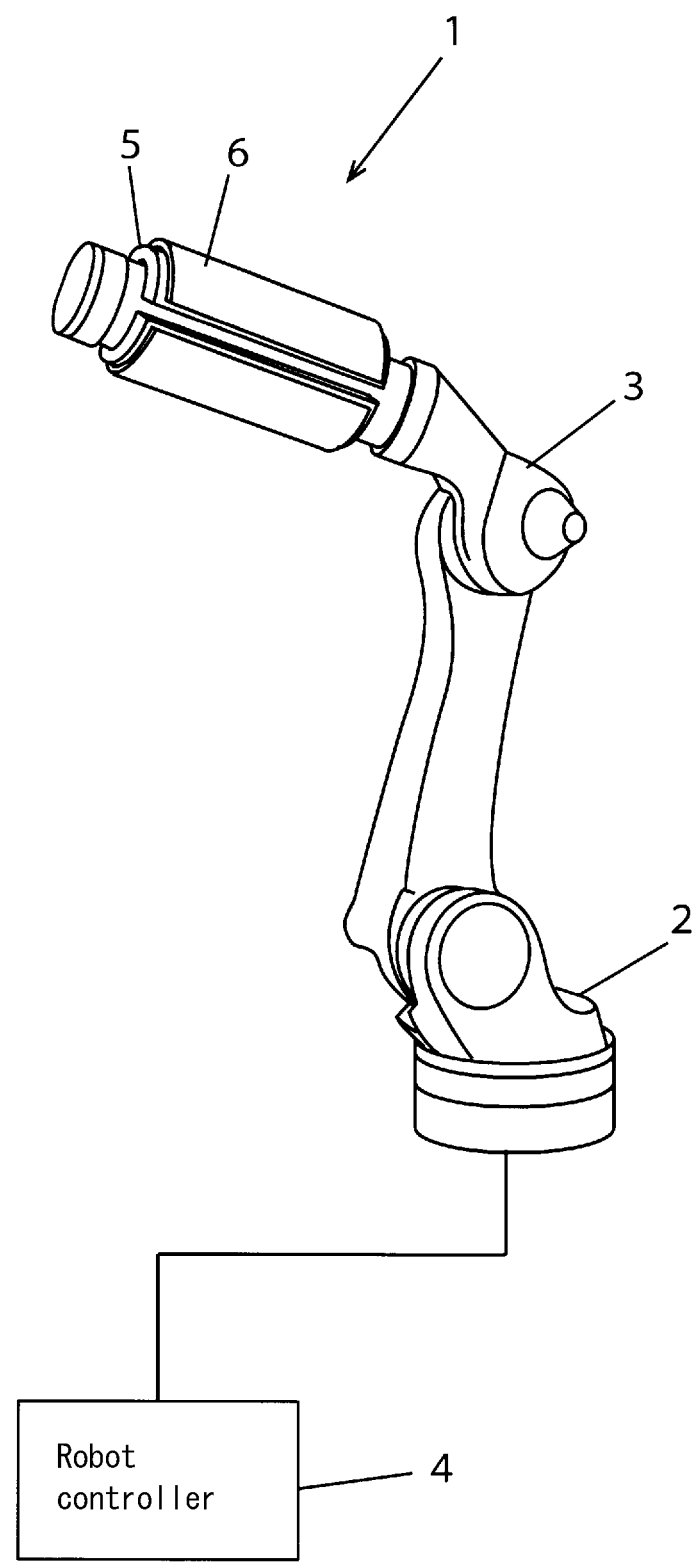
FIG. 1 illustrates a schematic configuration of a work robot according to one embodiment of the present invention.

Hereunder, a work robot according to one embodiment of the present invention will be described referring to the drawings. Note that the work robot according to this embodiment has a function to secure human safety in cooperative work between a person and a robot.

As illustrated in FIG. 1, a work robot 1 according to this embodiment comprises a robot base 2, a robot arm 3 whose base end portion is connected to the robot base 2, a robot controller 4 for controlling the operation of the robot arm 3, which configure a six-axis articulated robot.

Note that the work robot to which the present invention is applied is not limited to the six-axis articulated robot, and the present invention can be applied to various kinds of work robot having a robot arm.

Figure 2:
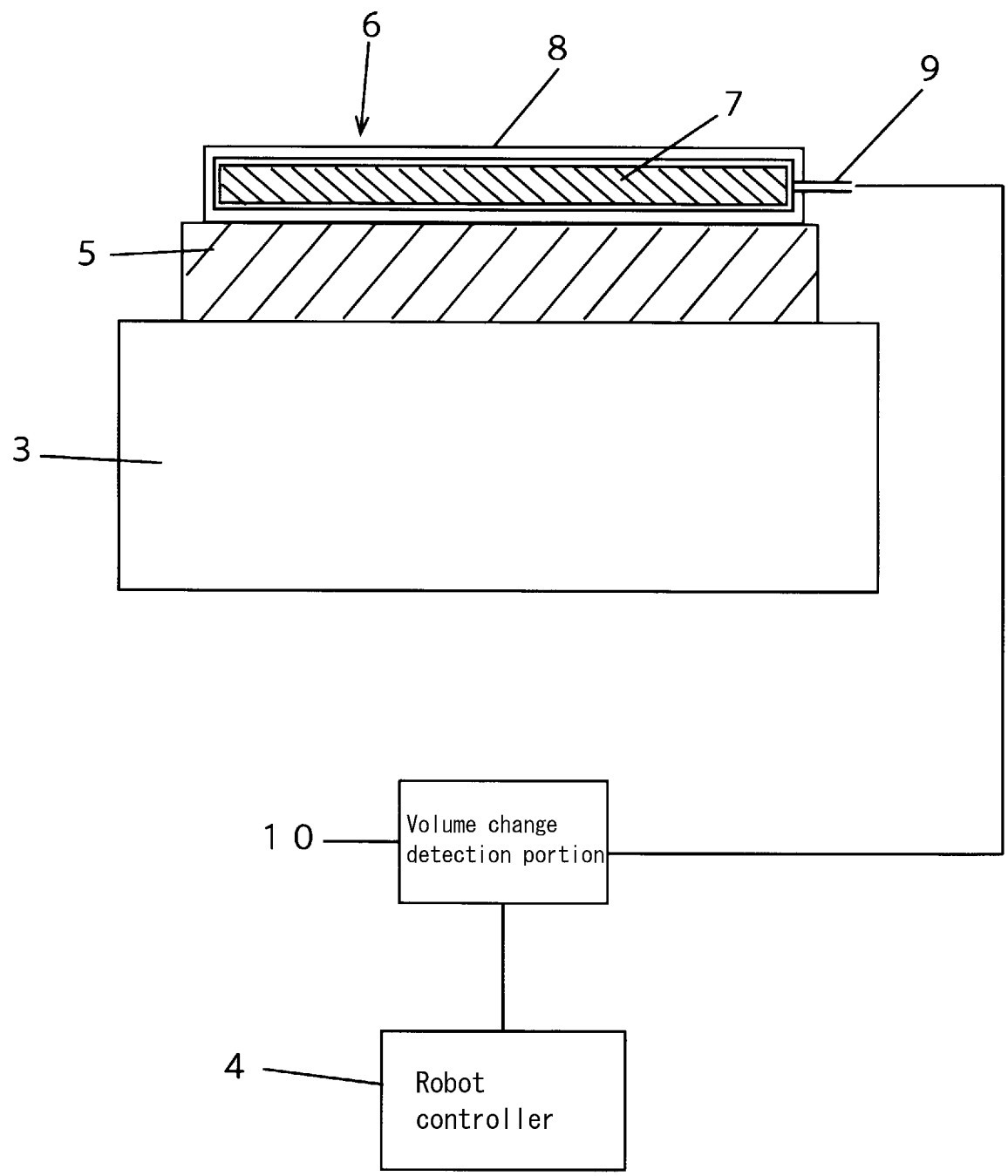
FIG. 2 is an enlarged view of a main portion of the work robot in FIG. 1.

As illustrated in FIG. 1 and FIG. 2, in the work robot 1 according to this embodiment, an impact buffering member 5 for alleviating impact when the robot arm 3 contacts an object (person or obstacle) is further provided on the surface of the robot arm 3. The impact buffering member 5 can be formed of a sponge, for example. The degree of hardness (hardness/softness) and the thickness of the impact buffering member 5 are set to values which do not cause harm to a person even when the robot arm 3 operating at the maximum speed collides with the person.

Note that, although the impact buffering member 5 is provided to a link on the distal end side of the robot arm 3 in FIG. 1, the position to which the impact buffering member 5 is provided is not limited thereto and it can be provided to an appropriate part of the robot arm 3 which may contact with a person or an obstacle during operation.

The work robot 1 according to this embodiment further comprises a contact detection unit 6 for detecting contact between the robot arm 3 and an object. The contact detection unit 6 has sufficient flexibility as a whole so that the cushioning effect is not reduced even when it is arranged on the surface of the impact buffering member 5.

Specifically, as shown in FIG. 2, the contact detection unit 6 has a sponge member 7 provided on the surface side (the side opposite to the robot arm 3) of the impact buffering member 5. The sponge member 7 is configured by an open-cell soft porous member, and the soft porous member is formed of a material softer than the impact buffering member 5.

The sponge member 7 is entirely housed in a bag-like housing member 8 formed of a flexible material. The back surface side of the housing member 8 is placed on the surface of the impact buffering member 5. As illustrated in FIG. 2, in this example, the impact buffering member 5 is arranged outside the housing member 8, and the housing member 8 containing the sponge member 7 is laminated on the impact buffering member 5 provided on the surface of the robot arm 3.

One end of a fluid discharge pipe 9 communicating with the inside of the housing member 8 is connected to the housing member 8. The fluid discharge pipe 9 discharges the air (fluid) pushed out from the inside of the housing member 8 when an object contacts the housing member 8 and the sponge member 7 is deformed and the volume of the housing member 8 decreases.

The other end of the fluid discharge pipe 9 is connected to a volume change detection portion 10. The volume change detection portion 10 is configured to detect the change in pressure inside the housing member 8 of the contact detecting unit 6 utilizing the air discharged through the fluid discharge pipe 9 thereby detecting that the volume of the housing member 8 is changed (decreased).

An output signal of the volume change detection portion 10 is transmitted to the robot controller 4 for controlling driving of the robot arm 3. The robot controller 4 is configured to control driving of the robot arm 3 based on a detection signal from the volume change detection portion 10. Specifically, when it is detected by the volume change detection portion 10 that the volume of the housing member 8 has been changed, the robot controller 4 slows down the operation speed of the robot arm 3 during operation, or stops the operation to restrict the operation of the robot arm 3 to secure human safety.

Here, since the pressure inside the housing member 8 may change due to expansion of the air caused by increase in temperature, for example, it is necessary to distinguish between such a natural change and a change due to contact with a person. Accordingly, in addition to monitoring the change amount of the internal pressure of the housing member 8, or instead of monitoring the change amount of the internal pressure, the volume change detection portion 10 monitors the change rate of the internal pressure (time differentiated value of the change amount). By monitoring the change rate of the internal pressure in this way, it is possible to distinguish between a case where the pressure gradually changes due to expansion of the air caused by a change in temperature and a case where the pressure suddenly changes due to contact with a person.

Further, after judging that a person has contacted the robot arm 3, in order to judge whether the person has already left the robot arm 3 or is still in a contact state, the internal pressure itself may be measured and compared with a certain threshold value in addition to or instead of the change rate of the internal pressure so as to determine the contact of the person.

Note that, the volume change detection portion 10 does not necessarily have to be configured separately from the robot controller 4, and can be incorporated in a control circuit of the robot controller 4.

Further, the robot controller 4 in this embodiment has a function of routinely checking whether or not the contact detection unit 6 normally operates. Specifically, the robot controller 4 is configured to bring the robot arm 3 into contact with a known object with a predetermined operation and determine, based on a detection signal from the contact detection unit 6 at that time, whether or not the contact detection unit 6 normally operates.

Here, the above-mentioned known object with which the robot arm 3 is brought into contact with the predetermined operation may be a structure configuring a part of the work robot 1. In this way, by using the structure configuring a part of the work robot 1, it is possible to allow the above-mentioned predetermined operation to be performed using a common operation program regardless of the installation situation of the robot at a work place.

Note that, although the fluid present inside the housing member 8 of the contact detection unit 6 is air in this embodiment, it may be a gas other than air or a liquid.

Further, the volume change detection portion 10 detects the pressure of the fluid in this embodiment, instead of or in addition to this, the flow of the fluid may be detected. Particularly, when a liquid is used as fluid, it is preferable to detect its flow.

It is also possible to provide a cover member (not shown) so as to cover both the contact detection unit 6 and the impact buffering member 5 from the outside. In this case, the cover member may be utilized as a fixing unit for fixing the contact detection unit 6 and the impact buffering member 5 to the surface of the robot arm 3.

Next, the effect of the work robot 1 according to this embodiment will be described with reference to the drawings.

Figure 3:
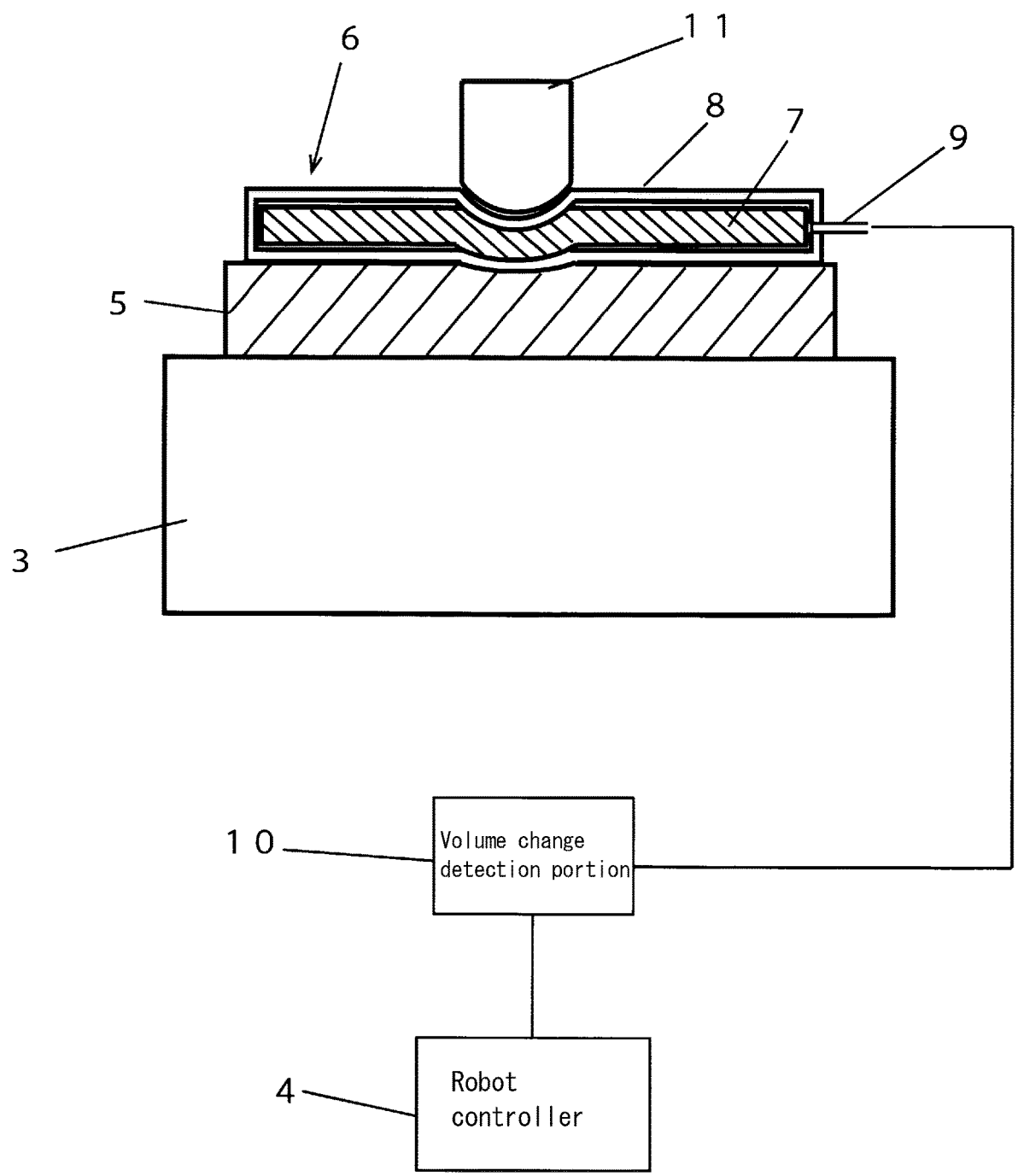
FIG. 3 illustrates the operation of the main portion of the work robot in FIG. 2.

As illustrated in FIG. 3, when an object (person or obstacle) 11 contacts the contact detection unit 6 provided on the robot arm 3, a part of the flexible housing member 8 configuring the contact detection unit 6 and a part of the sponge member 7 therein are deformed toward the front surface side of the robot arm 3. At this time, since also the back surface side of the housing member 8 is formed of a flexible material, the back surface of the housing member 8 is also deformed downward as the sponge member 7 is deformed downward.

Here, the contact detection unit 6 is provided on the impact buffering member 5 made of a sponge material, and the sponge member 7 of the contact detection unit 6 is softer than the material (sponge) configuring the impact buffering member 5 (that is, the impact buffering member 5 is harder), and therefore the sponge member 7 is sufficiently compressed in its thickness direction by an external force. Thereby, the volume of the housing member 8 decreases and the air inside the housing member 8 is pushed out through the fluid discharge pipe 9.

The volume change detection portion 10 detects that the volume of the housing member 8 has changed (decreased) utilizing the air discharged through the fluid discharge pipe 9, and the detection signal is transmitted to the robot controller 4. When receiving the detection signal from the volume change detection portion 10, the robot controller 4 slows the operation speed of the robot arm 3 or stops the operation. Thereby, it is possible to avoid a dangerous situation such as a person being caught by the robot arm 3.

Further, since the impact buffering member 5 is provided on the surface of the robot arm 3, the impact when the robot arm 3 contacts a person is alleviated, and it is possible to prevent a person from being injured upon contact.

As described above, according to the work robot 1 of this embodiment, even when a person contacts the robot arm 3, the impact buffering member 5 can alleviate the impact upon contact and also the contact can be detected instantaneously and surely based on the detection signal from the volume change detection portion 10 so as to limit the operation of the robot. Therefore, in the cooperative work between a person and a robot or the like, its safety can be sufficiently secured.

Further, since the robot controller 4 of this embodiment has a function of routinely checking whether or not the contact detection unit 6 normally operates, it is possible to surely secure safety in a cooperative work between a person and a robot or the like.

Further, since the contact detection unit 6 and the impact buffering member 5 are formed separately, when a problem occurs in the contact detection unit 6 for example, the impact buffering member 5 is left untouched and only the contact detection unit 6 can be exchanged.

Next, a work robot according to another embodiment of the present invention will be described with reference to the drawings. Note that, in the following description, parts different from the above-mentioned embodiment will be described, and descriptions of common parts will be omitted or simplified.

Figure 4:
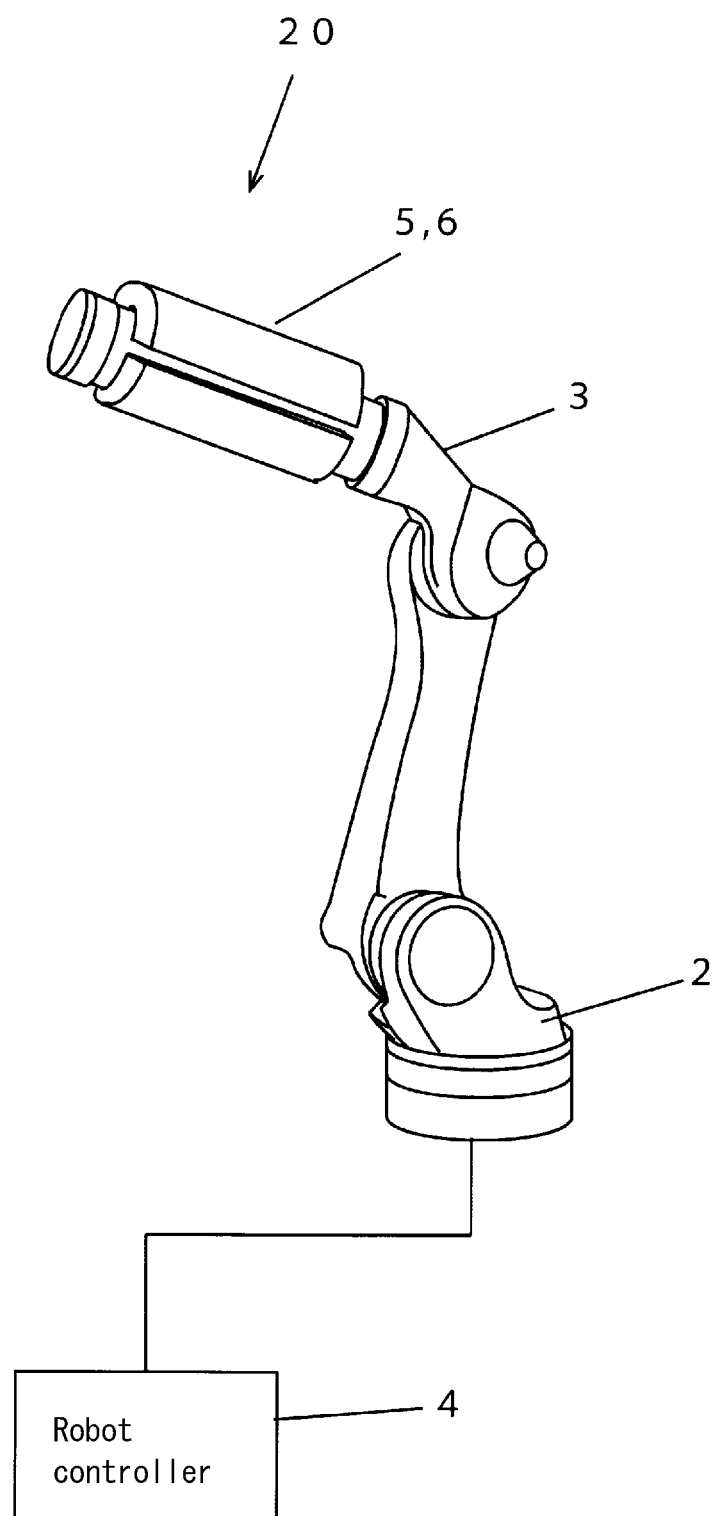
FIG. 4 illustrates a schematic configuration of a work robot according to another embodiment of the present invention.

In the work robot 1 according to the above-mentioned embodiment (FIG. 1), the impact buffering member 5 and the contact detection unit 6 are separately configured, while in a work robot 20 according to this embodiment, the impact buffering member 5 and the contact detection unit 6 are integrally configured as shown in FIG. 4.

Figure 5:
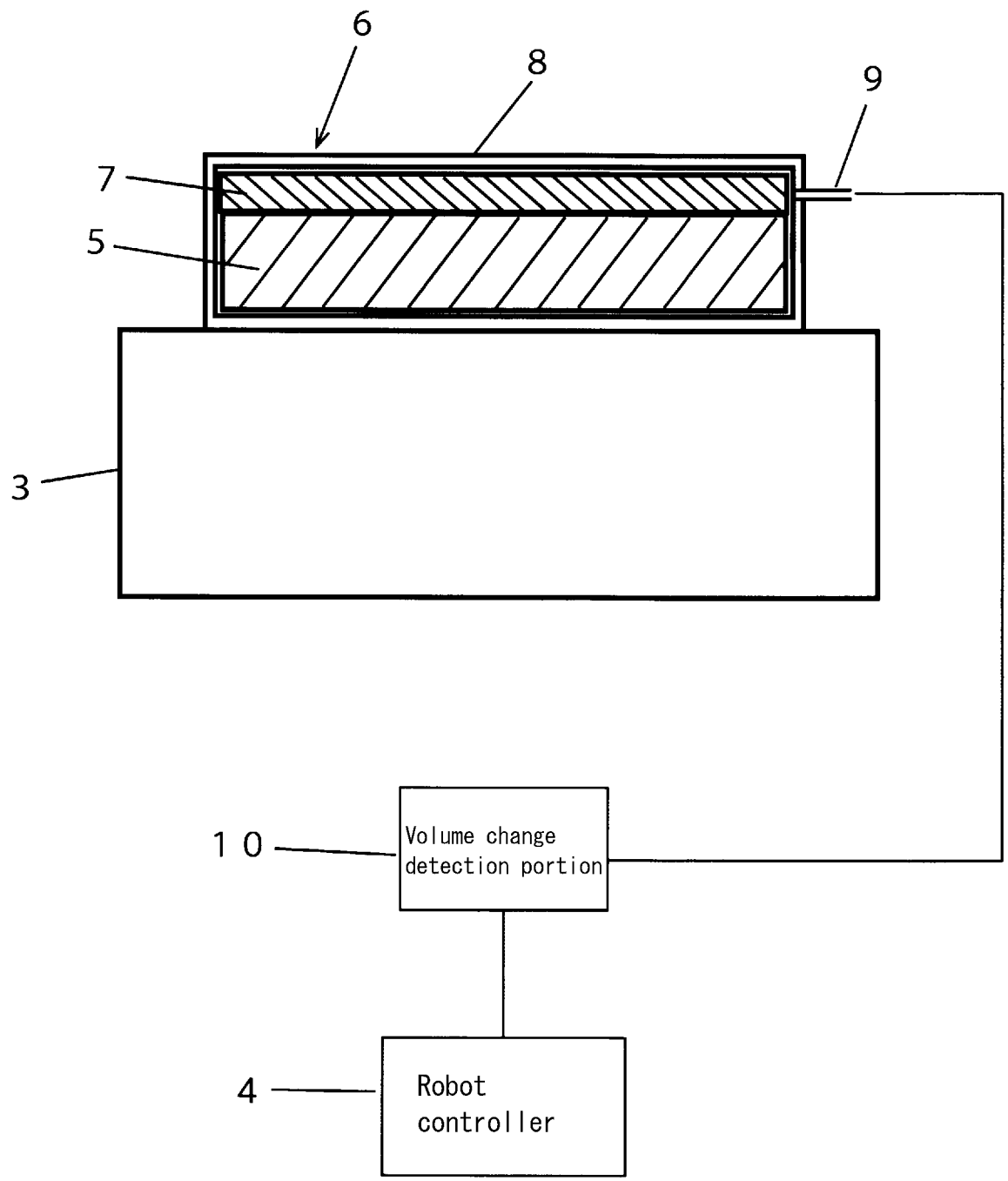
FIG. 5 is an enlarged view of a main portion of the work robot in FIG. 4.

Specifically, in the work robot 20 according to this embodiment, the impact buffering member 5 is arranged inside the housing member 8 together with the sponge member 7 as shown in FIG. 5. That is, the sponge member 7 is laminated on the impact buffering member 5 and the whole of them is contained in the housing member 8, and the back surface of the housing member 8 is attached to the front surface of the robot arm 3.

Figure 6:
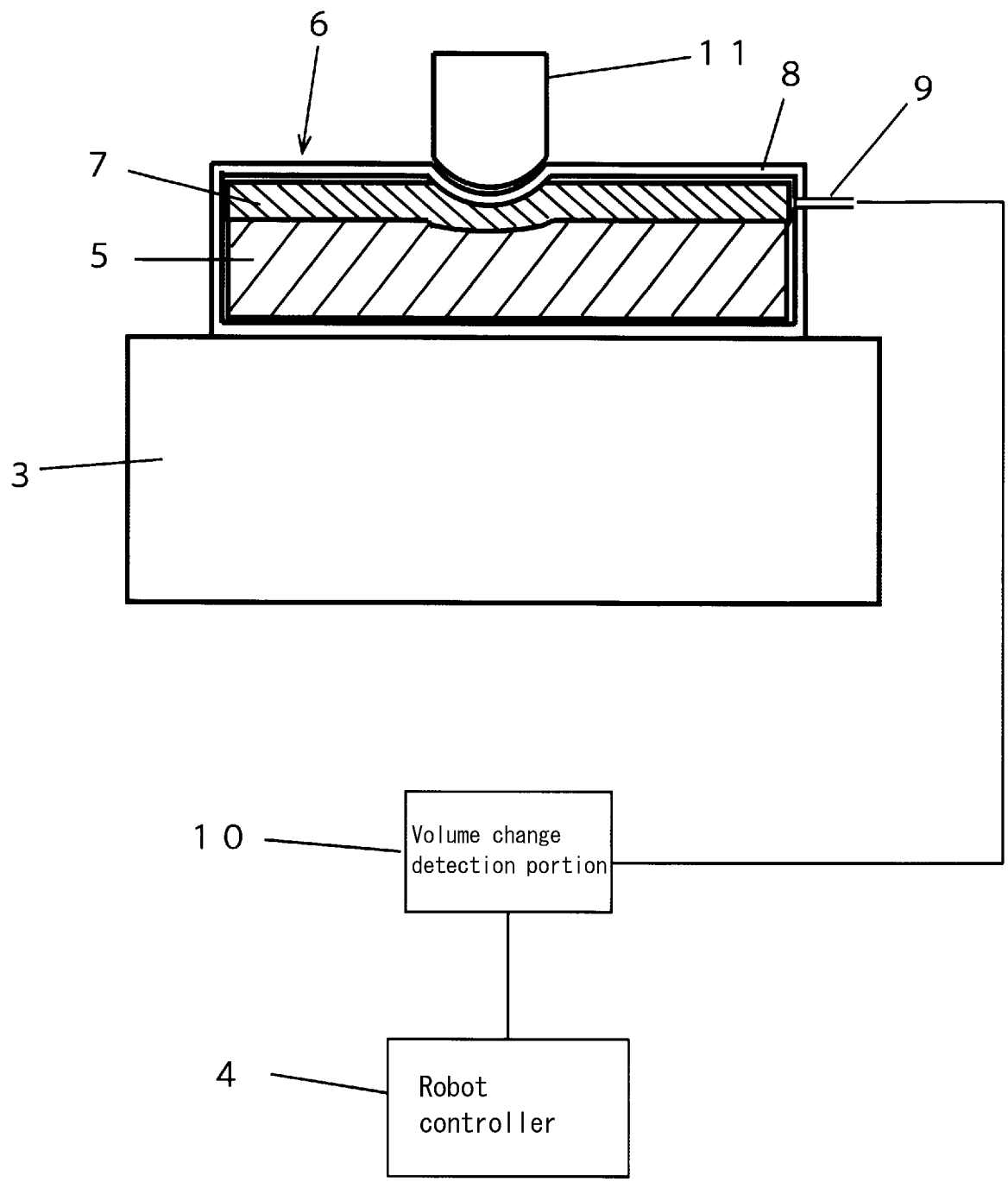
FIG. 6 illustrates the operation of the main portion of the work robot in FIG. 5.

Even in this embodiment, as illustrated in FIG. 6, when an object (person or obstacle) 11 contacts the contact detection unit 6 provided on the robot arm 3, a part of the flexible housing member 8 configuring the contact detection unit 6 and a part of the sponge member 7 therein are deformed toward the front surface side of the robot arm 3.

Here, the sponge member 7 of the contact detection unit 6 is laminated on the impact buffering member 5 made of a sponge material, and the sponge member 7 of the contact detection unit 6 is softer than the material (sponge) configuring the impact buffering member 5 (that is, the impact buffering member 5 is harder) as mentioned above, and therefore the sponge member 7 is sufficiently compressed in its thickness direction by an external force. Thereby, the volume of the housing member 8 decreases and the air inside the housing member 8 is pushed out through the fluid discharge pipe 9.

Therefore, also in the work robot 20 of this embodiment, as in the above-mentioned embodiment, even when a person contacts the robot arm 3, the impact buffering member 5 can alleviate the impact upon contact and also the operation of the robot can be limited based on the detection signal from the volume change detection portion 10. Therefore, in the cooperative work between a person and a robot or the like, its safety can be sufficiently secured.

Further, since the impact buffering member 5 is integrated with the contact detection unit 6 in this embodiment, it is easy to handle in the attaching operation to the robot arm 3 or the like.

Next, a work robot according to another embodiment of the present invention will be described with reference to the drawings. Note that, in the following description, parts different from the above-mentioned embodiment will be described, and descriptions of common parts will be omitted or simplified.

Figure 7:
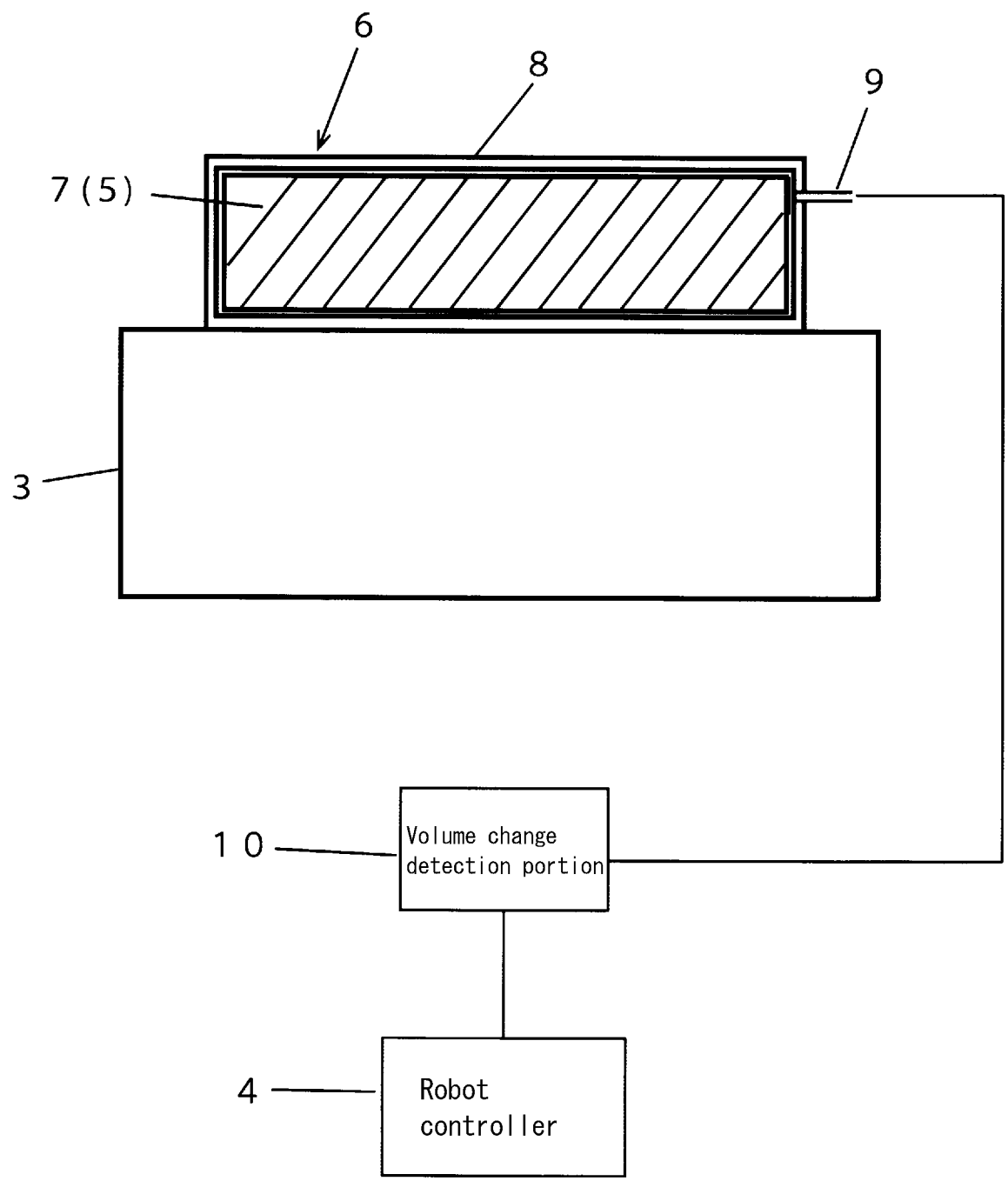
FIG. 7 is an enlarged view of a main portion of a work robot according to another embodiment of the present invention.

As illustrated in FIG. 7, in a work robot of this embodiment, the sponge member 7 of the contact detection unit 6 is formed thick and the sponge member 7 itself has a function of sufficiently alleviating the impact when the robot arm 3 contacts an object. That is, in this embodiment, the sponge member 7 also serves as the impact buffering member 5.

Since the sponge member 7 of the contact detection unit 6 also serves as the impact buffering member 5 in this embodiment, the structure can be simplified.

Next, a work robot according to another embodiment of the present invention will be described with reference to the drawings. Note that, in the following description, parts different from the above-mentioned embodiment will be described, and descriptions of common parts will be omitted or simplified.

Figure 8:
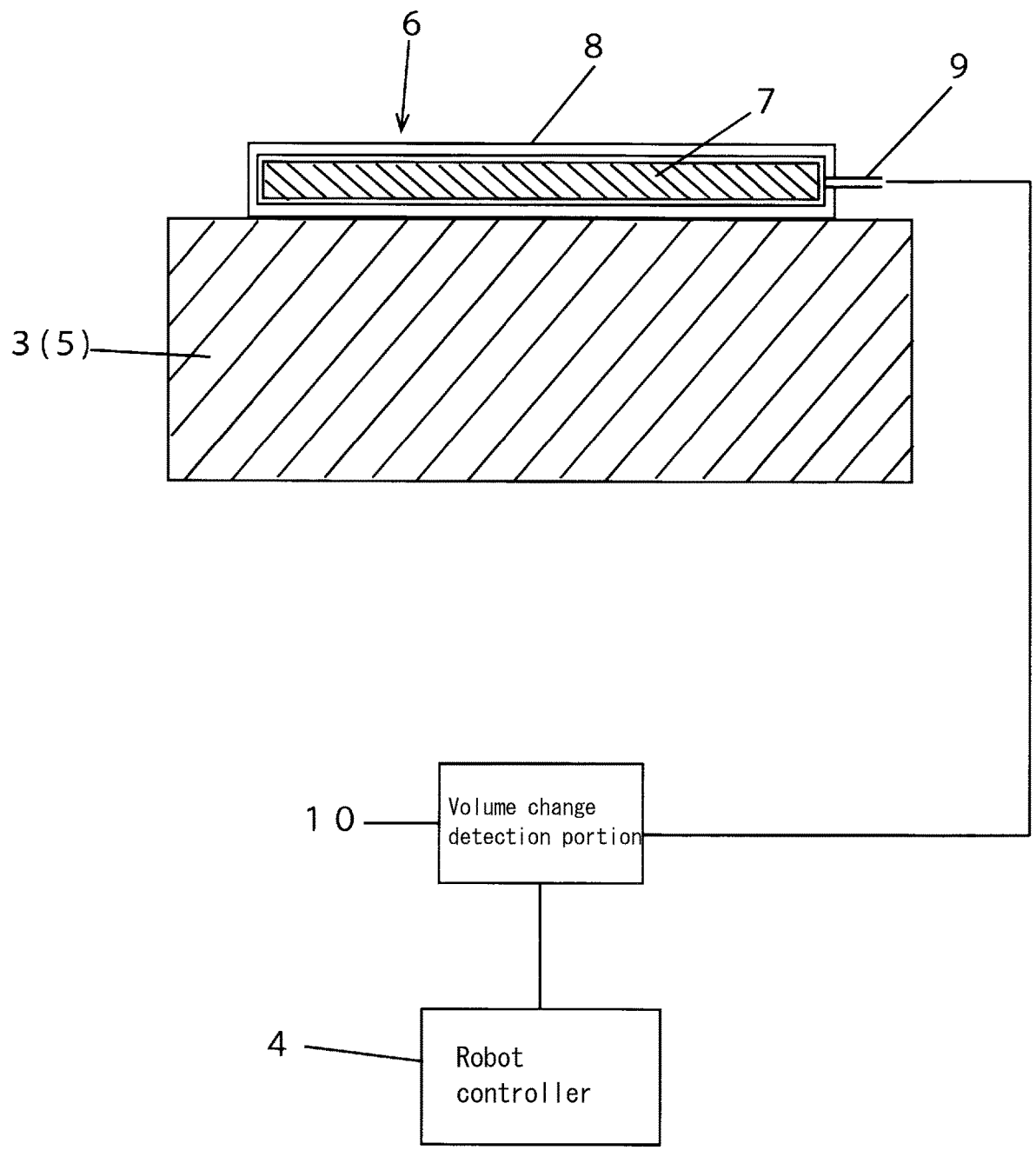
FIG. 8 is an enlarged view of a main portion of a work robot according to another embodiment of the present invention.

As illustrated in FIG. 8, in the work robot of this embodiment, the robot arm 3 itself is formed of the impact buffering member 5 alleviating the impact when contacting an object. That is, in this embodiment, the robot arm 3 also serves as the impact buffering member 5.

Since the robot arm 3 also serves as the impact buffering member 5 in this embodiment, the structure can be simplified.

DESCRIPTION OF REFERENCE NUMERALS 1, 20 . . . work robot
2 . . . robot base
3 . . . robot arm
4 . . . robot controller
5 . . . impact buffering member
6 . . . contact detection unit
7 . . . sponge member
8 . . . housing member
9 . . . fluid discharge pipe
10 . . . volume change detection portion
11 . . . object (person or obstacle)

The invention claimed is:

1. A work robot comprising:
a robot arm; and
a contact detection unit provided on a surface of the robot arm configured to detect a contact between the robot arm and an object,
wherein the contact detection unit has:
a soft porous member;
a housing member including the soft porous member and formed of a flexible material;
a fluid discharge pipe communicating with an inside of the housing member, the fluid discharge pipe discharging a fluid inside the housing member when the object contacts the housing member so that a volume of the housing member decreases; and
a volume change detector configured to detect that the volume of the housing member is changed by utilizing the fluid discharged through the fluid discharge pipe, and
wherein the volume change detector is configured to monitor a change rate of a pressure inside the housing member by detecting a change of the volume of the housing member.

2. The work robot according to claim 1,
wherein at least a part of the robot arm is formed of an impact buffering member for alleviating an impact when the robot arm contacts the object; and
wherein the housing member is provided on a surface of the impact buffering member.

3. The work robot according to claim 1, further comprising a robot controller for controlling driving of the robot arm,
wherein the robot controller is configured to control driving of the robot arm based on a detection signal from the volume change detector.

4. A work robot comprising:
a robot arm;
an impact buffering member provided on a surface of the robot arm for alleviating an impact when the robot arm contacts an object; and
a contact detection unit configured to detect a contact between the robot arm and the object,
wherein the contact detection unit has:
  a soft porous member provided on a front surface side of the impact buffering member, the soft porous member being softer than the impact buffering member;
  a housing member including the soft porous member and formed of a flexible material;
  a fluid discharge pipe communicating with an inside of the housing member, the fluid discharge pipe discharging a fluid inside the housing member when the object contacts the housing member so that a volume of the housing member decreases; and
  a volume change detector configured to detect that the volume of the housing member is changed by utilizing the fluid discharged through the fluid discharge pipe, and
wherein the volume change detector is configured to monitor a change rate of a pressure inside the housing member by detecting a change of the volume of the housing member.

5. A work robot comprising:
a robot arm;
a robot controller;
an impact buffering member provided on a surface of the robot arm for alleviating an impact when the robot arm contacts an object; and
a contact detection unit configured to detect a contact between the robot arm and the object,
wherein the contact detection unit has:
  a soft porous member provided on a front surface side of the impact buffering member, the soft porous member being softer than the impact buffering member;
  a housing member including the soft porous member and formed of a flexible material;
  a fluid discharge pipe communicating with an inside of the housing member, the fluid discharge pipe discharging a fluid inside the housing member when the object contacts the housing member so that a volume of the housing member decreases; and
  a volume change detector configured to detect that the volume of the housing member is changed by utilizing the fluid discharged through the fluid discharge pipe,
wherein the robot controller is configured to bring the robot arm into contact with a known object by a predetermined operation and determine, based on a detection signal from the volume change detector at that time, whether or not the contact detection unit normally operates.

6. The work robot according to claim 5, wherein the known object is a structure configuring a part of the work robot.

7. The work robot according to claim 5, wherein the impact buffering member is arranged outside the housing member.

8. The work robot according to claim 5, wherein the impact buffering member is arranged inside the housing member.

9. The work robot according to claim 5, wherein the fluid is an air.

* * * * *